(12) United States Patent
Ling et al.

(10) Patent No.: US 6,570,749 B1
(45) Date of Patent: May 27, 2003

(54) OVER-CURRENT AND THERMAL PROTECTION DEVICE

(75) Inventors: Peter Ling, Kwai Cung (HK); Doug Magnuson, San Diego, CA (US)

(73) Assignee: Advanced Battery Technology LTD, Kwai Chung (HK)

( * ) Notice: Subject to any disclaimer, the term of this patent is extended or adjusted under 35 U.S.C. 154(b) by 253 days.

(21) Appl. No.: 09/671,383

(22) Filed: Sep. 27, 2000

Related U.S. Application Data

(60) Provisional application No. 60/218,321, filed on Jul. 14, 2000.

(51) Int. Cl.[7] ........................ H02H 3/00; H01M 10/50; H01H 61/06
(52) U.S. Cl. ..................... 361/102; 429/62; 337/140
(58) Field of Search ................. 361/102; 429/56, 429/58, 62, 97, 98, 66, 325; 338/32 R, 221; 337/108, 140, 102, 38, 393, 372, 365, 139, 141

(56) References Cited

U.S. PATENT DOCUMENTS

| | | | |
|---|---|---|---|
| 3,933,526 A | | 1/1976 | Rackin |
| 3,962,664 A | * | 6/1976 | Ty et al. .................... 337/86 |
| 4,090,163 A | * | 5/1978 | McIntosh et al. .......... 337/102 |
| 4,973,936 A | | 11/1990 | Dimpault-Darcy et al. |
| 5,691,073 A | | 11/1997 | Vu et al. |
| 5,747,187 A | * | 5/1998 | Byon ........................ 429/58 |
| 5,750,277 A | * | 5/1998 | Vu et al. ..................... 429/7 |
| 5,766,790 A | | 6/1998 | Kameishi et al. |
| 5,766,793 A | | 6/1998 | Kameishi et al. |
| 6,005,469 A | * | 12/1999 | Kalapodis et al. .......... 337/140 |
| 6,018,286 A | * | 1/2000 | Quinn et al. ............... 337/140 |

FOREIGN PATENT DOCUMENTS

| | | |
|---|---|---|
| EP | 0757394 A1 | 2/1997 |
| EP | 0773595 A1 | 5/1997 |
| EP | 0862231 A1 | 9/1998 |
| EP | 0875913 A2 | 11/1998 |
| EP | 0875913 A3 | 5/1999 |
| EP | 0918345 A1 | 5/1999 |
| EP | 0921550 A2 | 6/1999 |
| JP | 06005273 A | 1/1994 |
| JP | 08124554 A | 5/1996 |
| JP | 10074500 A | 3/1998 |
| JP | 10125304 A | 5/1998 |
| JP | 10302762 A | 11/1998 |
| JP | 10326610 A | 12/1998 |
| JP | 11054110 A | 2/1999 |
| JP | 11224579 | 8/1999 |
| JP | 11273651 A | 10/1999 |

* cited by examiner

Primary Examiner—Rajnikant B. Patel
(74) Attorney, Agent, or Firm—Donn K. Harms

(57) ABSTRACT

An over-current and thermal protection device adaptable for use as an electrical interrupt and in a battery environment. The protection device has a pair electrical conductors, an electrically conductive resilient switch member engageable in contact with the conductors to define an electrical conductivity pathway. The switch member is actuated by a thermally responsive shape memory alloy strip and activatable in response to a change in temperature at a predetermined level to effect a change in the metallurgical state of the shape memory alloy and position of the engagement of the switch member with one of the conductors.

29 Claims, 5 Drawing Sheets

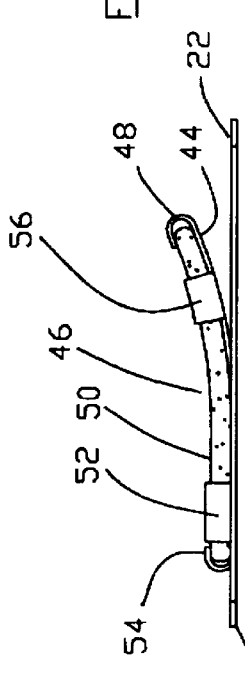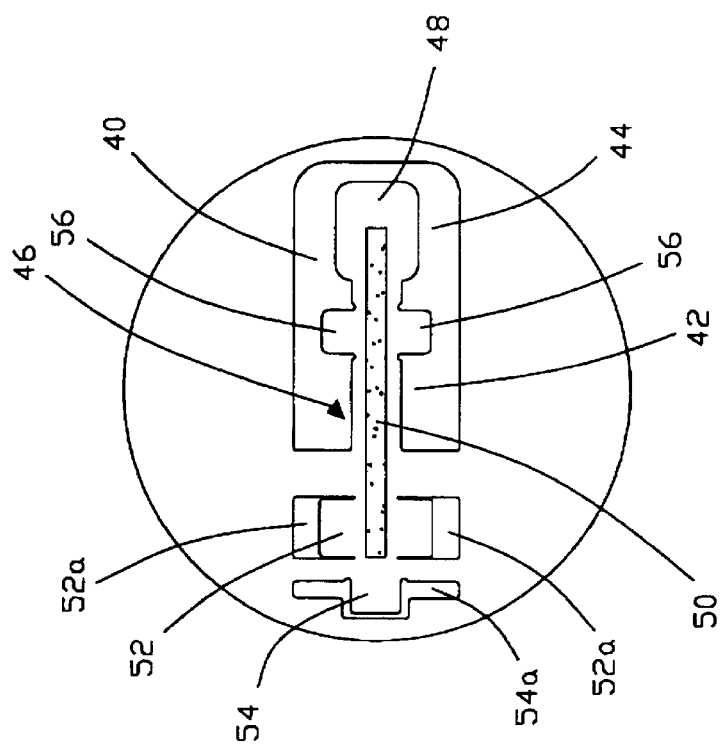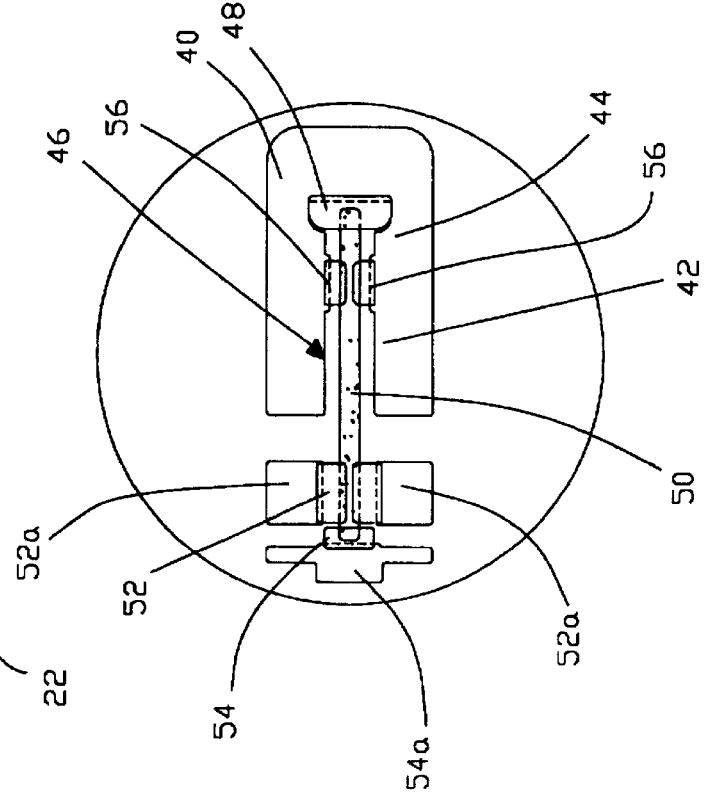
FIG. 3C
FIG. 3A
FIG. 3B

OVER-CURRENT AND THERMAL PROTECTION DEVICE

This application claims benefit of Provisional Application Serial. No. 60/218,321 filed Jul. 14, 2000.

FIELD OF INVENTION

This invention relates to an over-current and thermal protection device, which safely prevents current flow through the device upon an excessive increase in the temperature. The invention also relates to the use of such device for a battery cell.

BACKGROUND OF THE INVENTION

Electrical devices and apparatus are placed in services in complex operating conditions where they are subject to various factors such as voltage fluctuations, current flow and temperature. These factors affect operating efficiency as well as safety. Potential concerns due to over-current, short-circuiting and overheat developed within the electrical devices and apparatus are key design issues that must be addressed.

For a battery cell, for example, a short-circuit or overcharge (for rechargeable battery cells) can cause heat generation and excessive gaseous pressure buildup within the battery. To minimize the risk of such heat generation and excessive pressure, a protection device is therefore necessary. Various means have been incorporated for use, which are designed to break the internal electrical circuit of the battery and to disrupt the current flow passing through it.

A widely used device is a positive temperature coefficient (PTC) disc installed inside the battery cell. PTC discs are thermally expansive polymeric materials filled with conductive particles, such as carbon. When the PTC heats up due to abnormal conditions, it expands in thickness and increases its resistance, reducing the current to a safe level.

Another type of protection device uses bimetal springs, as actuators, which open the circuit with the protection device in series with the apparatus protected. The actuators operate at a specified temperature due to the thermal expansion property in the bimetals to open or close the electrical pathway.

A further example incorporates a contact switch that is made out of a shape memory alloy (SMA) and coated with an electrically conductive precious metal. The contact switch opens or closes the electrical contacts by way of the changes in the metallurgical states of the SMA material. These devices tend to be expensive or difficult to manufacture due to either the material used, the processing method of the material, or the number of components in the assembly.

In view of the various designs and performance of existing commercially available devices, it would be advantageous to have a simple, inexpensive and highly functional over-current and thermal protection device.

SUMMARY OF THE INVENTION

According to the present invention, an over-current and thermal protection device is provided. The protection device has a pair of electrical conductors that are electrically insulated from each other. A contact switch is positioned between the conductors and is engageable in contact with the conductors to define an electrical conductivity pathway. The contact switch is provided with a temperature responsive actuator made of an SMA. The SMA undergoes a change in the metallurgical state when subject to a variation in temperature at a predetermined level. The variation in the temperature of the SMA could be due to excessive current (over-current) passing through the electrical conductivity pathway, or from other causes in the operating environment of the protection device. The metallurgical change in turn causes the SMA to stiffen or soften and to effect changes in the engagement of the contact switch and the electrical conductivity pathway.

In one embodiment of the invention, the contact switch is formed of an elongated member of an electrically conductive disc or conductor disc in contact with one of the conductors. The elongated member resiliently engages in contact with the other conductor to establish the electrical conductivity between the two electrical conductors. An SMA strip is secured along the elongated member and adaptable to undergo a metallurgical state change from martensite to austenite at a predetermined elevated temperature. Upon the metallurgical state change, the SMA strip stiffens and counteracts the resiliency of the elongated member to effect disengagement of the elongated member from the conductor thereby disrupting the electrical conductivity pathway.

In application, the protection device can be used as a current interrupt to protect against excessive current passing through electrical device or apparatus. The protection device is also adaptable for use in a battery cell environment to protect against thermal run-away or overcharging. In battery cell applications, the protection device incorporates a pressure responsive mechanism for relief of excessive pressure build-up within the battery cell.

These and other aspects and advantages of the invention will become apparent from the following detailed description, and the accompanying drawings, which illustrate by way of example the features of the invention.

BRIEF DESCRIPTION OF THE DRAWINGS

FIG. 3A is a plan view of a conductor disc and a shape memory alloy strip placed on an elongated member of the conductor disc for use in the present invention.

FIG. 3B is another plan view of the conductor disc and the shape memory alloy strip secured by tabs on an elongated member of the conductor disc.

FIG. 3C is an elevational view of the conductor disc and the shape memory alloy strip secured by tabs on an elongated member of the conductor disc.

SPECIFIC DESCRIPTION

The present invention provides an over-current and thermal protection device The protection device has a pair of electrical conductors, which are electrically isolated from each other. A contact switch is positioned electrically between the conductors and is engageable with the conductors to define an electrically conductivity pathway. The contact switch incorporates a temperature responsive actuator made of a shape memory material. The actuator is activatable in response to a rise in temperature to a predetermined level, which causes a metallurgical state change in the shape memory alloy to change the engagement of the switch from one of the conductors and disrupt the electrical pathway.

Figure 1:
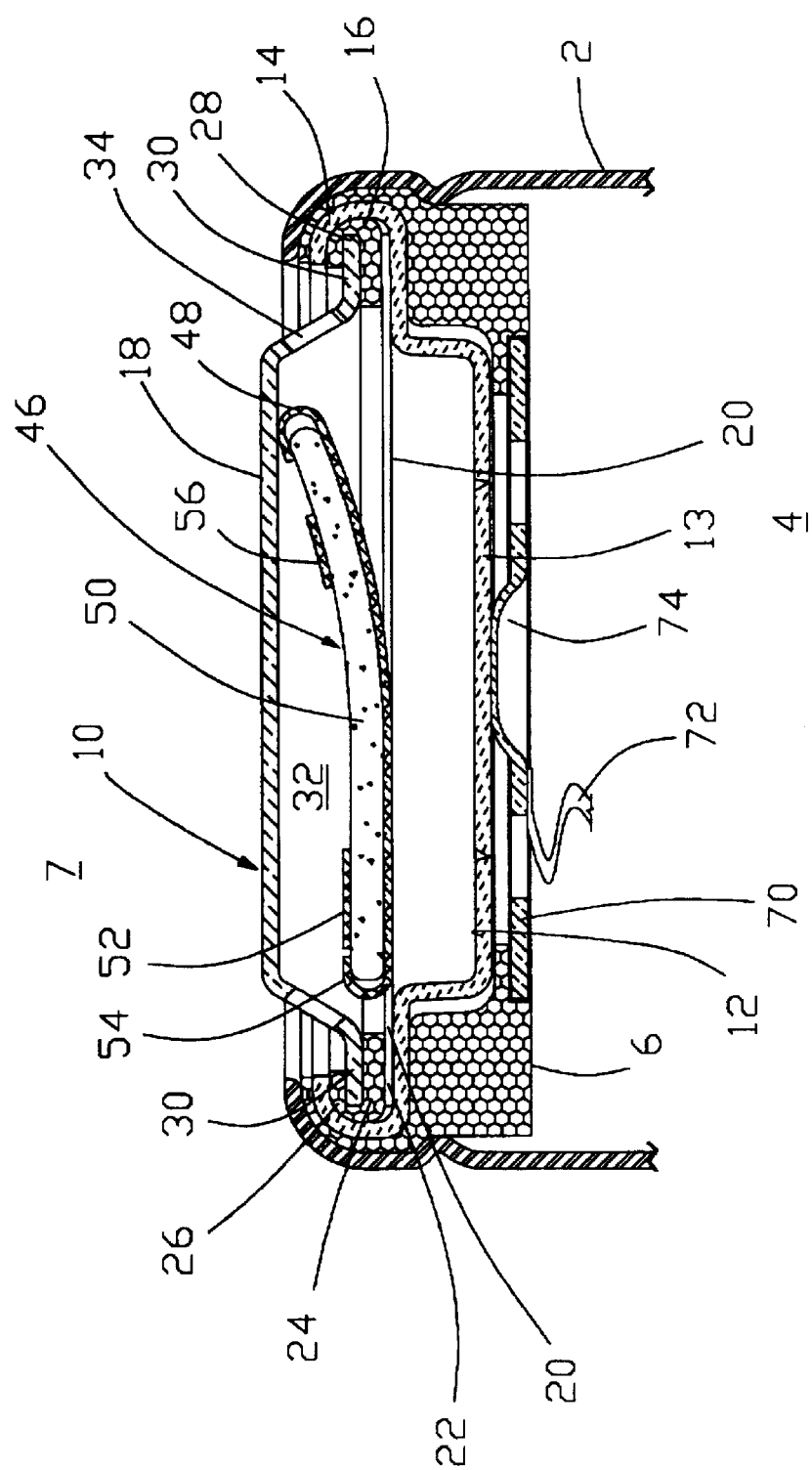
FIG. 1 is a sectional view of the over-current and thermal protection device of the present invention placed in a battery cell environment.
Figure 2:
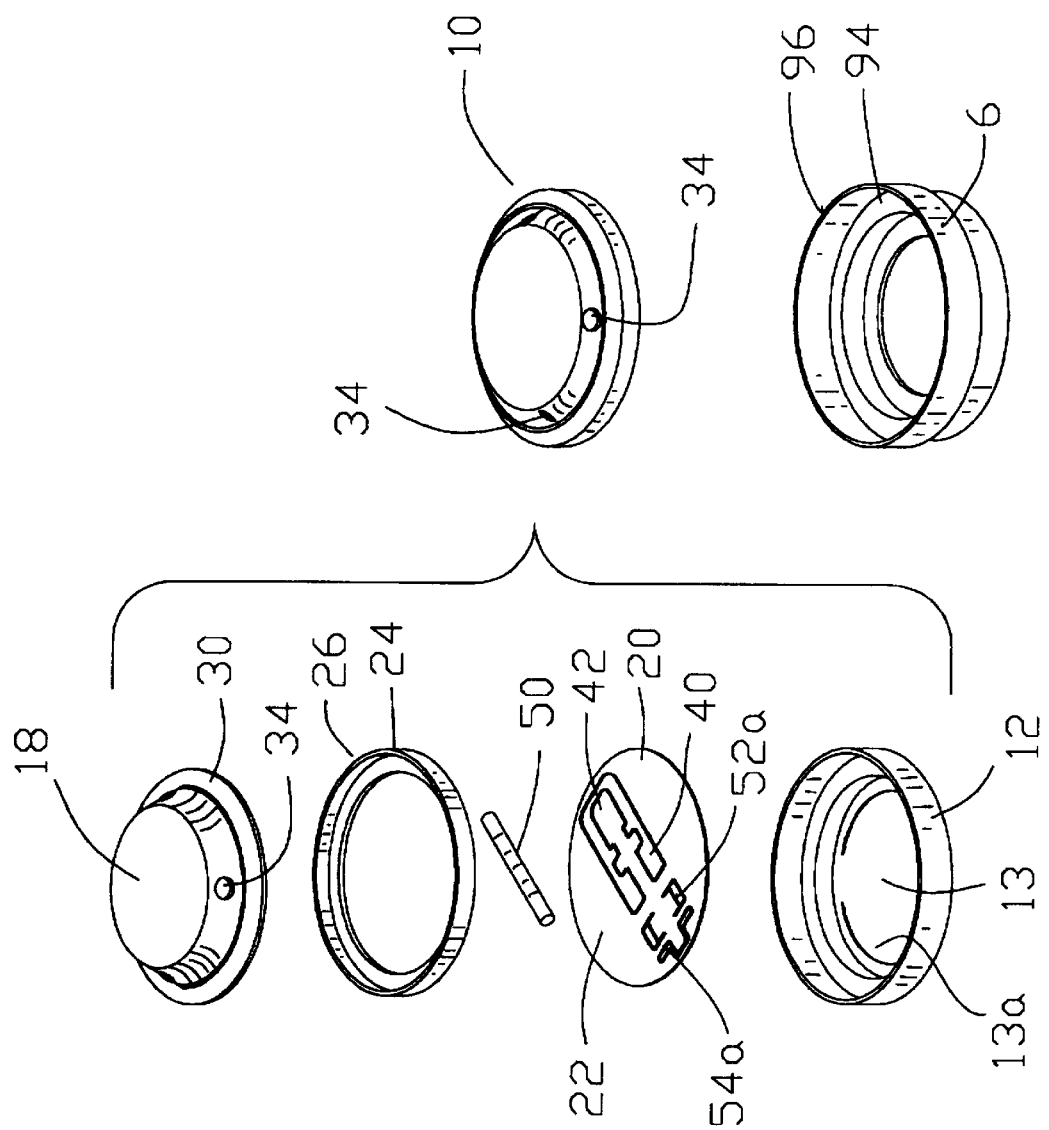
FIG. 2 is an exploded perspective view of the over-current and thermal protection device of the present invention.

As shown in FIGS. 1 and 2, the over-current and thermal protection device (10) comprises a base member (12), which is generally made of an electrically conductive material such as copper and aluminum or a material having an electrically conductive coating. In a battery environment, the protection device (10) is positioned and secured at the upper portion of a battery can (2) with an electrically insulating gasket or grommet (6). The protection device is adaptable to establish electrical conductivity from a battery feed (72) that is electrically connected to base member (12). In a typical Lithium Ion battery, for example, the battery can (2) is negative and the thermal protection device (10) is positive when the battery is in a state of discharge. Additionally, the protection device of the present invention can also be used in an electrical interrupt interposed in series between an electrical apparatus and a source of electricity.

Grommet (6), which is generally in a ring configuration, insulates the protection device (10) from making contact with the battery can (2) and creates a hermetic seal between the interior of the battery (4) and the outside environment (7). The hermetic seal prevents any contamination from entering the cell, which could degrade the performance of the battery. The seal also prevents any chemical contents from exiting the cell. Grommet (6) is preferably made of a resilient dielectric material such as nylon or polypropylene and of a grade that is moldable as necessary by common manufacturing methods.

The base member (12) is generally in the shape of a circular dish with an upraised circumferential portion (14) which extends inwardly to define an inner peripheral channel (16) to receive an electrically conductive disc or conductor disc (20), a conductor cap (18), and a ring gasket (24) disposed between conductor disc (20) and cap (18). Conductor disc (20), cap (18) and ring gasket (24) are secured within the peripheral channel (16) by mechanically crimping the upraised circumferential portion (14) during assembly.

The conductor disc (20) is generally of a circular planner configuration with a peripheral portion (22) that is in electrical contact with the base member (12). It is made of an electrically conductive material having spring-like resilient property, such as nickel-plated steel to provide strength, electrical conductance and corrosion resistance. Other electrically conductive materials such as beryllium-copper plated with high conductive precious metal coatings can also be used. In one embodiment of the invention, variations in the thickness of the conductor disc designs range between 0.1 and 2.5 mm.

Conductor disc (20) is electrically insulated from cap (18) by ring gasket (24), which is disposed between cap (18) and the peripheral portion (22) of conductor disc (20). Ring gasket (24) is made of a resilient dielectric material such as nylon or polypropylene, and of a grade that is moldable as necessary by common manufacturing methods. Ring gasket (24) is fittably installed within the inner channel (16) of base member (12). The ring gasket (24) has an upraised inward portion (26), which defines an inner peripheral channel (28).

Cap (18), which forms the upper portion of the protection devices, is adaptable to establish electrical conductivity with other devices (not shown) for which current protection may be needed. In a battery cell application, cap (18) serves as the anode of the battery when supplying current to the external device (discharge state). As shown in FIGS. 1 and 2, cap (18) has a downwardly and outwardly circumferential flange (30), which fits into the inner peripheral channel (28) of the ring gasket (24).

Ring gasket (24) is seated on the peripheral portion (22) of the conductor disc (20), and resiliently secures both cap (18) and conductor disc (20) along the inner peripheral channel (16) of the base member (12). The upraised inward portion (26) of ring gasket (24) electrically isolates cap(18) from the base member (12) and conductor disc (20). One or more apertures (34) are provided on cap (18) to permit venting of gaseous build-up in the interior (32) of the battery (4).

As shown in FIGS. 3A, 3B and 3C, conductor disc (20) has a cut-out portion (40) generally in the shape of an elongated U-shape, (or alternatively a pair of parallel slots connected at their distal ends) to result in an elongated freely movable member (42) with a free end portion (44) to define a contact switch (46). The contact switch (46) is bent by pre-stress so its end portion (44) is held in contact with the cap (18) by the spring-like resilient property of the conductor disc (20) material to define a closed position. In the closed position, electrical conductivity through the protection device or electrical conductivity pathway is established between base member (12) and cap (18) via contact with the conductor disc (20) and through the contact switch (46), as shown in FIGS. 1 and 2C.

At the free end (44) of the elongated member (42), there is a distal tab (48), which is foldable to secure a temperature responsive actuator, which comprises a shape memory alloy ("SMA") strip (50) along the length of the elongated member (42). As shown in FIGS. 1 and 3A, 3B and 3C, the SMA strip (50) is also secured at its proximal end portion by tabs (52) and (54), which are formed as part of conductor disc (20) material. Similar to tab (48), the proximal tabs (52) and (54) are formed by cut-outs 52A and 54A, respectively. These cut-outs allow the tab (52) and tab (54) materials to be separable from the planar surface of the conductor disc so they can be foldable to fasten and secure the SMA strip (50) onto the conductor disc (20).

In addition, tabs (56) are provided to secure the SMA strip (50) along the length of the elongated member (42) thus resulting in a highly conforming lineal profile between the SMA strip (50) and elongated member (42). The tabs and the conforming lineal profile ensures a significant physical contact between the lengths of the SMA strip (50) and the elongated member (42) to enable.the transfer of heat, as well as bending stress and mechanical force between them.

The cut-outs (40), 52A and 54A of the conductor disc 20 can be achieved by die-stamping or other common manufacture methods in one operation during fabrication of the conductor disc. As shown in FIGS. 2, 3A, 3B and 3C, conductor disc 20 is generally circular in shape, having a planner surface with a periphery that conforms to the inner circumference of the inner channel 16 of the base member 12. The conformance allows the conductor disc 20 to self-center, which facilitates the assembly of the protection device. However, the conductor disc 20 can be made in a different shape such as a rounded rectangle where at least its peripheral portion is fittable within channel 16 of the base member 12 in contact with the base member.

Before the SMA strip 50 is installed and fastened onto the elongated member 42 by the tabs, it is cold worked and tempered to achieve a metallurgical martensitic state in a temperature range where the electrical conductivity pathway is intended to be maintained. In the present invention, the SMA strip 50 can be fabricated from wire stock where it can be drawn continuously through mold dies to a specific diameter. Thereafter, the SMA wire stock is heat treated while it is held in the desired shape and then cooled to the martensitic state of the SMA material at the normal operating temperature range of the protection device. In one embodiment of the invention, the SMA wire stock is heated up to approximately 500° C. for at least five minutes. Thereafter, the SMA stock is air cooled to between 0° C. and 55° C. For purposes of the discussions herein, normal operating conditions are those under which equipment and apparatus protected by the protection device, maintain operation without the activation of the protection device. Thus normal operating temperature is the temperature at which such equipment and apparatus are designed to operate. In the specific embodiment presented herein, the contact switch under normal operating conditions is in a closed position to maintain the electrical conductivity pathway.

In the martensitic state, the SMA material exhibits pliability and flexibility. Following cooling, the SMA wire stock is cut into individual segments or strips, which are bent to a deformed shape having a desired lineal profile or bent curvature conforming to the elongated member 42. In the exemplary embodiment of the present invention, the SMA strip 50 is bent to result in having less than 6% strain, with a preferred strain of between 2% to 4%. The amount of strain is calculated by comparing the ratio of bend radius to the wire diameter. By way of an example, a wire of 0.6 mm diameter should not exceed a bend radius of approximately 7.5 mm in order to maintain a 4% strain or less. Alternatively, the SMA strips may be bent after they have been secured onto the elongated strip. It is recognized that the bend radius of the contact switch 46 effected by the pre-stress, as discussed above, would also conform to that of the SMA strip.

The use of the SMA wire stock offers flexibility for adjusting the amount of force that is required to counter the spring force in the contact switch 46 for it to disengage from the closed position. For example, in the present invention, the actuating force of the SMA strip 50 can be adjusted by changing the SMA wire stock diameter. The mechanical strength of the SMA strip 50 increases exponentially with the increase in diameter. In one embodiment of the present invention, the SMA wire diameter is 0.64 mm. In alternative designs, wire diameters ranging from 0.5 mm to 0.75 mm are also effective. Examples of SMA materials suitable for the present application include alloys of nickel and titanium. However, other commercially available shape memory alloy materials can be used.

The use of SMA wire stock in the fabrication of SMA strip 50 offers ease of material handling and reduces the production costs. However, other forms of the SMA alloy such as flat sheet and tubing can also be used and the invention is not limited by the form of the SMA stock supply. The circular cross-sectional geometry of wire stock reduces additional cold working steps which might be required when other forms of the SMA are used.

As referred above, at normal operating temperature range of the protection device, where electrical conductivity pathway is maintained, the SMA strip is in a martensitic metallurgical state. At this state, the SMA strip is pliable sufficiently to yield to the spring force of the elongated member material so as to take on the lineal profile of the elongated member 42 in the closed position as shown in FIGS. 1 and 3C.

Various causes can result in the changes in temperature to effect a change in the SMA metallurgical state. For example, a temperature rise could result from an increase in the ambient temperature of the operating environment where the protection device is situated. Over-current through the electrical pathway can also generate resistive heat in the protection device components, including the SMA strip 50.

When the temperature of the SMA strip 50 in the interior 32 of the protection device 10 reaches the predetermined transition temperature of the SMA material, the SMA strip 50 exhibits an internal force sufficient to straighten both the SMA strip 50 and the elongated member. The internal force effects the separation of the contact switch 46 from the cap 18. In the embodiment shown, the temperature for the SMA strip 50 to complete its phase transition ranges from 60° C. to 80° C. This temperature range is affected by heat treatment, as well as the particular types of alloy used, as known in the art. While the SMA strip 50 is in the austenite state it remains stiff and straight until it cools to the martensitic state and becomes pliable again.

As described above, the SMA material has a one way shape memory effect that permanently changes back to its original annealed shape upon reaching its final austenite transition temperature. By training the SMA material if desired, the contact switch 46 can be made to reclose upon cooling of the SMA strip 50. That is, by instituting repeated cycles of cooling, deforming and heating, the SMA material can be trained to assume a number of metallurgical states at predetermined temperatures.

As mentioned above, the present invention uses commonly available electrically conductive materials in the fabrication of the conductor disc 20 and contact switch 46, and incorporates the use of a SMA strip as a simple and effective temperature-responsive actuator. While the contact switch 46 is normally disposed in a closed position, the SMA strip 50 disengages the switch 46 from cap 18 thereby cutting off the electrical conductivity between the base member 12 and the cap 18. When used as an over-current protection device, the disengagement occurs when the temperature of the SMA reaches the transition temperature of the SMA material due to the resistive heat generated by excessive current passing through the electrical pathway of the protection device.

The amount of resistive heat expected to be generated generally relates to the amount of current flow (to the square power, or $I^2$) and to the resistance (R) of the electrically conductivity pathway. Thus, the ranges of current flow and temperatures of the protection device in operating conditions (where electrical conductivity is maintained) can be determined, taking into consideration the resistance in the electrical pathway and the range of transition temperatures of the SMA strip material. Other design factors such as dimensions, shapes and choice of materials for the construction of the base member 12, the cap 18 and the conductor disc 20, which could affect the resistance, may also be considered as known in the art.

Figure 4:
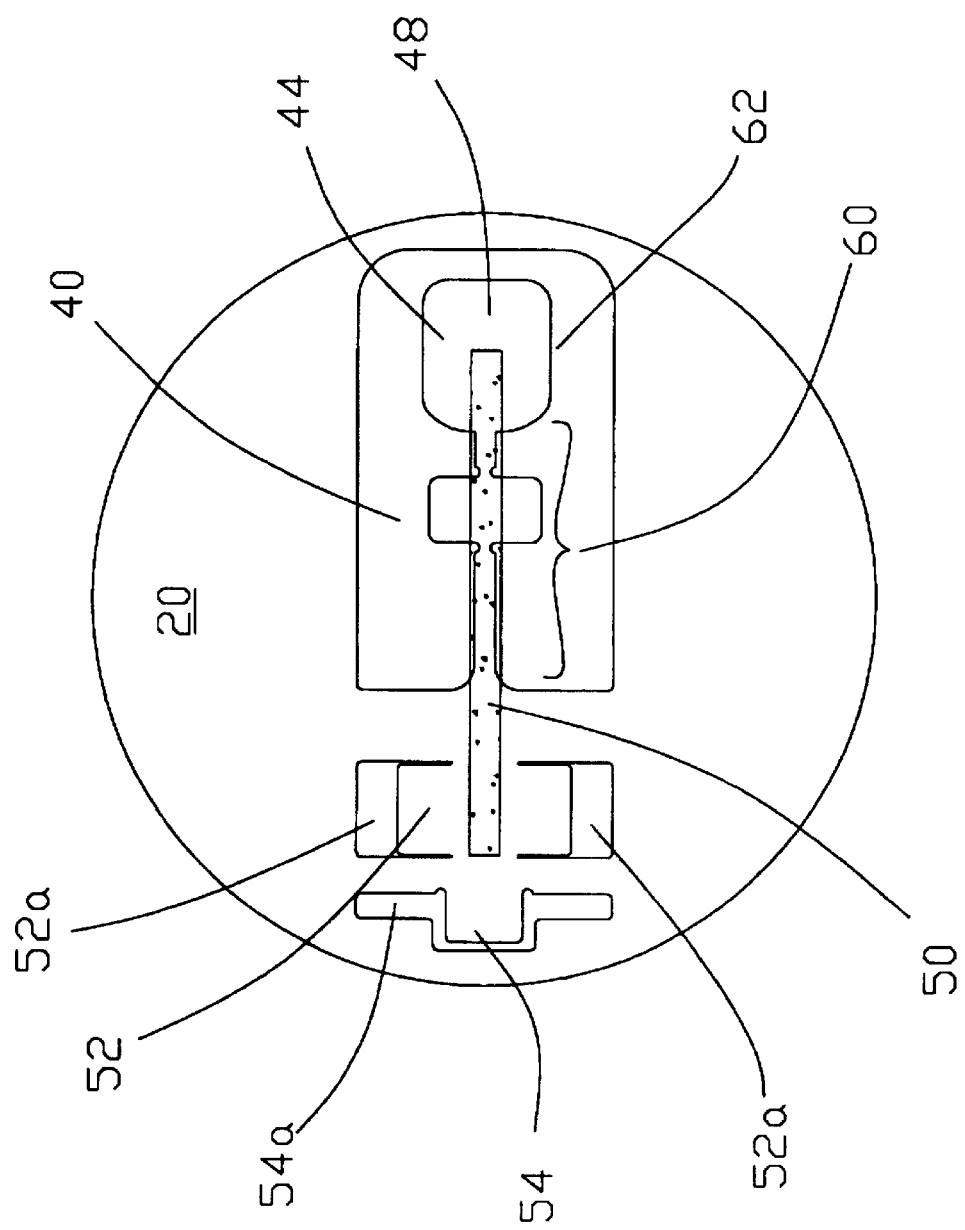
FIG. 4 is a plan view of conductor disc and a shape memory alloy strip placed on an elongated member with a narrowing width.

FIG. 4 shows another embodiment of the present invention where a narrowing portion 60 of the elongated member 62 has a predefined relatively narrower cross-sectional area or electrical flow path to provide a greater electrical resistance relative to the remaining portions along the length of the elongated member 62. If over-current occurs, the narrowing portion 60 creates a greater localized heat generation than the wider portion of the elongated member 62 due to the increased resistance of the narrow portion 60. The localized heat is then transferred to the SMA strip 50 by thermal conduction. Once the SMA strip 50 reaches the predetermined metallurgical transition temperature, the internal metallurgical change causes an internal force to stiffen the strip, restoring it to the previously annealed straight position and separating the contact switch 46 from cap 18. This separation effectively interrupts the current flow through the electrical conductivity pathway.

Thus, the present invention provides an effective means of over-current and thermal protection device, which safely prevents current flow through the device upon an excessive increase in the temperature.

As described, the above specific embodiments show a normally closed electrical conductivity pathway of the protection device, where the contact switch is engaged in contact with both the base member and the cap and the SMA strip in one metallurgical state at a lower temperature to define a normal operating condition.

However, the protection device can also be configured such that a normal operating condition is defined by an open electrical conductivity pathway. In this configuration, the contact switch is engaged in contact with one of the base member or the cap only and the contact switch is pre-stressed to prevent contact with the other one of the base member or the cap. A SMA strip can be installed and secured along the elongated member of the contact switch in a metallurgical state at a predetermined lower operating temperature level. When the temperature level exceeds this predetermined lower level, the SMA changes to another metallurgical state such that the SMA strip stiffens to actuate the switch member to reverse from its previously disengaged condition and establish the electrical conductivity pathway.

Accordingly, the metallurgical state changes of the SMA strip material associated with the temperature changes at predetermined levels could therefore be adopted to establish or disrupt the electrical: pathway as the operation of the protected equipment may require for protection or control.

The present invention offers ease in the assembly of its component parts. Conductor disc 20 is inserted into the inner channel 16 of base member 12. Elongated member 42 is bent upwardly such that contact switch 46 is extended to reach its intended engaged or closed contact position with the Cap 18. The ring gasket 24 is placed on top of the peripheral portion 22 of the conductor disc 20. Cap 18 is then fitted between the upraised portion 26 of the ring gasket 24 and rests in the gasket channel 28. The upraised circumferential portion 14 of the base member 12 is mechanically crimped down on top of the upraised portion 26 of the ring gasket 24 by a predetermined force to secure the various components as an assembly.

In a battery application, the protection device 10 is placed inside of the insulating grommet 6 which sits inside the battery can 2. The top edge perimeter of the battery can 2 is mechanically crimped over the grommet 6 with a predetermined force which securely holds the protection device 10 in place.

For battery application, the protection device can also incorporate a pressure responsive mechanism for relief of excessive pressure build-up within the battery cell. As also shown in FIG. 1, the pressure responsive mechanism comprises a pressure resistant plate 70 which is electrically connected by an electrical conductor 72 to a cell conductor of the battery. (Pressure resistant plate is electrically conductive and of sufficient thickness that it does not substantially deform relative to the base member 12. It remains relatively non-deformable at elevated pressures at least up to about 600 psi (4.14×106 Pascal.).

Pressure plate 70 is secured to base member 12 by welding a raised portion 74 to a diaphragm 13 of base member 12. Diaphragm 13 is of material that is electrically conductive and of minimal thickness of between about 0.1 and 0.5 millimeter. The diaphragm 13 can be fabricated as a thinner portion of the base member 18 that is subject to flex or even tear when exposed to excessive internal pressure from inside the battery. In one embodiment of the present invention, the diaphragm 13 has a thickness about 0.3 mm as part of the base member made of aluminum. The material properties and thickness can be changed in order to achieve a desirable flex pressure in the diaphragm 13.

Figure 5A:
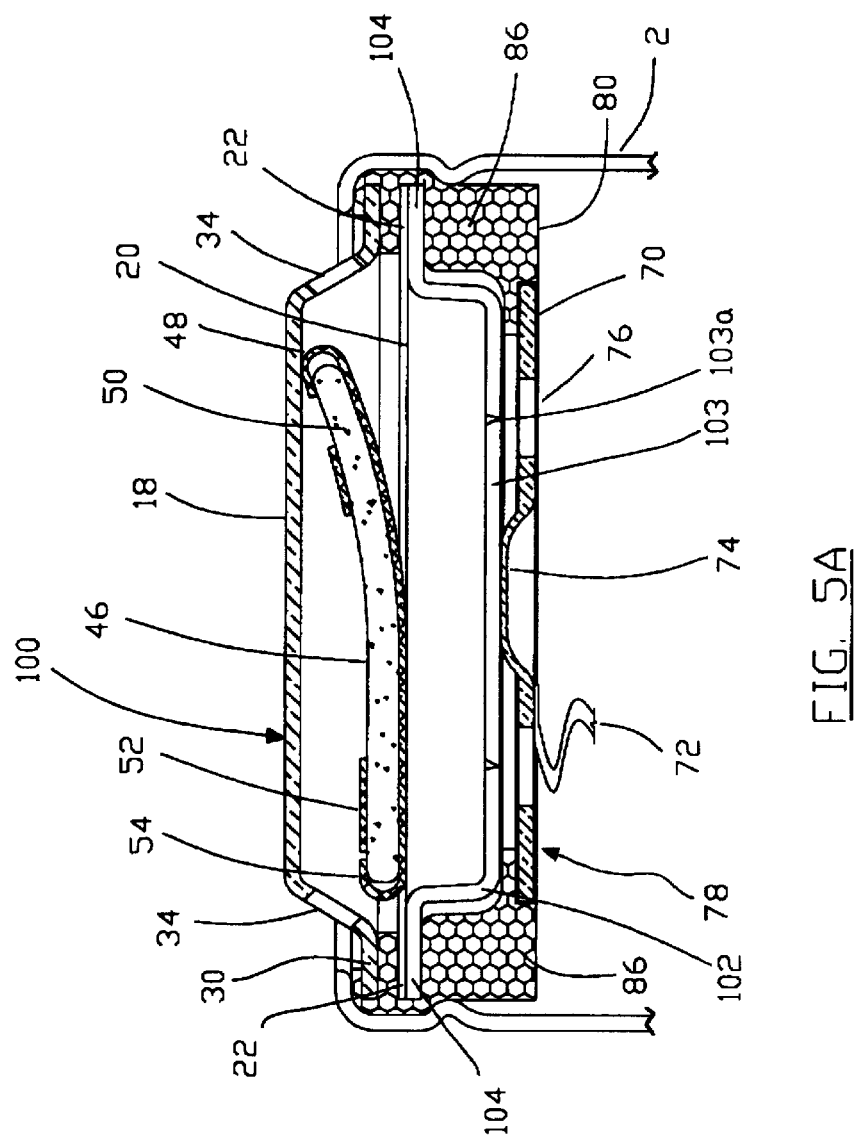
FIG. 5A is sectional view of the over-current and thermal protection device of the present invention which incorporates a pressure protective mechanism and placed in a battery cell environment.

Pressure plate 70 is provided with at least one vent hole 76 such that the underside of base member 12 is in gaseous communication with the interior of the battery cell and subject to the same internal gaseous pressure. The diaphragm 13 is advantageously coined so that it ruptures at a predetermined pressure. The diaphragm surface may be stamped or etched so that a portion of the surface is of smaller thickness than the remainder portion of base member 12. One specific diaphragm 13 for use in the present invention is coined to impose a semicircular or C-shaped burst groove 13A in its surface as shown in FIGS. 2 and 5A. The geometry of the semi-circle can also be manipulated to accurately adjust the pressure at which it flexes or tears open.

The shape of the groove advantageously is the same or similar to the shape of a major portion of the peripheral edge of diaphragm 13 and positioned advantageously in proximity to the peripheral edge. The particular pressure at which venting takes place is controllable-by varying parameters such as the depth, location or shape of the groove as well as hardness of the material.

If gas pressure within the battery cell exceeds a predetermined value, diaphragm 13 bulges into the interior 32 of the protection device. The bulging, which is also enhanced by the presence of the burst.grove 13A, causes the weld between the diaphragm 13 and the pressure resistance plate 70 to break thereby breaking electrical conductivity between the pressure plate and the base member. The break is designed to occur without causing any leakage of the chemical. However, in the event that the gaseous pressure continues to increase due to, over-heating, misuse, or other chemical reactions, diaphragm 13 ruptures or separates from the base member 12 to allow the excessive gases to escape from the battery to the interior 32 of the protection device 10 and passing through one or more apertures 34 on cap 18 to exit the battery to the outside environment 7.

In one embodiment of the present invention, the weld between the diaphragm 13 and the pressure plate 70 breaks when the pressure is increased from approximately, 120–150 psi. The break in the weld causes the diaphragm 13 to separate from pressure plate 70 which breaks the electrical conductivity between the battery cell and the protection device without the release of any gases from the battery cell. When the additional pressure is increased to approximately 300–350 psi, burst grove 13A would cause the rupture or separation of the diaphragm from the base member, allowing gaseous build-up from the battery cell to enter the interior portion of the protection device and to the outside environment thus reducing the pressure within the battery cell.

FIG. 5 shows another embodiment of the present invention in which the protection device 100 is applied to a battery environment. As shown in FIG. 5A, protection device 100 is secured at the top portion of the battery can 2 by a grommet 80.

Figure 5B:
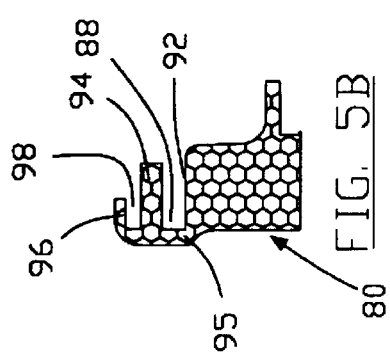
FIG. 5B is a partial sectional view of a grommet molded for use in a battery cell to secure the over-current and thermal protection device of the present invention.
Figure 5C:
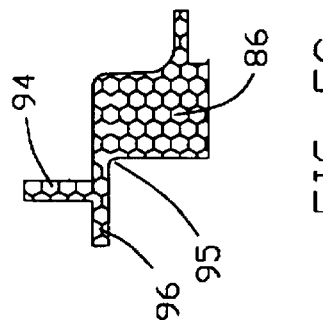
FIG. 5C is another partial sectional view of a grommet unmolded before its use in a battery cell to secure the over-current and thermal protection device of the present invention.

Grommet 80 is of a resilient dielectric material, which can be fabricated to assume the circumferential cross-sectional profile as shown in FIG. 5B to accommodate the various parts of the protection device. Alternatively, grommet 80 can be preformed with a circumferential cross-section profile as shown in FIG. 5C, which is then folded to assume the circumferential cross-sectional profile during installation of the protection device onto the battery can. Grommet 80 has a generally circular main body 86 with an outward peripheral ring 96 on which an upraised peripheral ridge 94 is disposed. Before or during assembly of the protection device parts onto the battery can, the grommet 80 is folded along a circumferential neck portion 95. On folding, the upper portion 92 of the grommet main body 86 and ridge 94 defines a peripheral channel 88, which is adapted to securably receive a base member 102 of the protection device and the conductor disc 20.

As shown in FIG. 5A, base member 102 is seated within channel 88 of grommet 80 along its circumferential flange 104, together with conductor disc 20 and in electrical contact with its circumferential portion 22. The dimensions and resiliency of grommet 80 are selected such that the base member 102 and the conductor disc 20 are 5 secured in the channel 88 to ensure electrical conductivity between the base member 102 and conductor disc 20.

As shown in FIG. 5A, cap 18 is fitted within channel 98 of grommet 80 along its peripheral flange 30, which is electrically insulated from the based member 102 and conductor 20. Channel 98 is formed by ridge 94 and the outermost portion of the ring 96 when it is folded inwardly into shape. As previously presented, the conductor switch 46 of the conductor disc 20 is pre-stressed and bent to establish electrical conductivity between the switch and the cap 18 to define a normally closed electrical conductivity pathway.

As obvious from the above, the present invention exhibits various advantages in terms of simplicity and low-cost in its manufacture and operation. It incorporates much less number of components in the design thereby reduces the cost and simplifies the assembly process.

While the above description of the invention is directed to the present embodiments or examples of applications, various modifications and improvements can be made without departing from the spirit and scope of the invention.

We claim:

1. An over-current and thermal protection device comprising:
   (i) a pair of electrical conductors;
   (ii) an electrically conductive resilient switch member interposed between the conductors and engageable with the conductors to define and electrical conductivity pathway, and
   (iii) a thermally responsive actuator comprising a shape memory alloy cooperatively engaged with said switch member and activatable in response to a change in temperature thermally conducted from a surface of said switch member, at a predetermined temperature level, to effect a change in the position of the engagement of the switch member with one of the conductors.

2. The over-current and thermal protection device according to claim 1 wherein the switch member comprises an elongated member resiliently engageable in contact with one of the conductors to define the electrical conductivity pathway.

3. The over-current and thermal protection device according to claim 1 wherein in response to the change in temperature to the predetermined level, the actuator overcomes the resilient engagement of the switch member with the said one of the conductors.

4. The over-current and thermal protection device according to claim 1 wherein the thermally responsive actuator comprises an elongated shape memory strip secured along the length of the elongated member and adaptable to effect heat and mechanical stress transfer between the actuator and the elongated member.

5. The over-current and thermal protection device according to claim 1 wherein the change in temperature is caused by electric current passing through the electrical pathway.

6. The over-current and thermal protection device according to claim 1 wherein the change in temperature causes a change in the metallurgical state of the shape memory alloy from a martensitic state to a austenitic state at the predetermined temperature level.

7. The over-current and thermal protection device according to claim 1 wherein the martensitic state of the shape memory alloy is at a temperature below the predetermined temperature level and the austenitic state is at a temperature above the predetermined temperature level.

8. The over-current and thermal protection device according to claim 1 wherein predetermined level is effected by heat-treating the shape memory actuator material to an elevated temperature to at least approximately 500° C. for at least approximately 5 minutes and by cooling the material between 0° C. and 50° C. thereafter.

9. The over-current and thermal protection device according to claim 2 wherein the elongated member has a portion of reduced cross section adaptable to bear greater amount of resistive heat relative to other portions of the elongated member when subject to an electrical current along the electrical pathway.

10. The over-current and thermal protection device according to claim 1 wherein the temperature change is substantially due to electrical current passing through the electrical conductivity pathway.

11. The over-current and thermal protection device according to claim 1 wherein the switch member includes an elongated member forming part of a conductor disc in contact with one of the pair of conductors, the elongated member being resiliently engageable in contact with the other one of the pair of conductors and a shape memory alloy strip secured along the length of the elongated member of the conductor disc and activatable in response to a change in temperature at a predetermined level to effect a change in the position of the engagement of the elongated member with the said other one of the pair of conductors.

12. The over-current and thermal protection device according to claim 4 wherein the shape memory strip has a circular cross-sectional geometry.

13. The over-current and thermal protection device according to claim 12 wherein the shape memory strip has a cross-section diameter of between 0.5 and 0.75 mm.

14. The over-current and thermal protection device according to claim 13 wherein the shape memory strip has a cross-section diameter of 0.60 mm.

15. The over-current and thermal protection device according to claim 4 wherein the shape memory strip is bent to result in having a material strain of between 2% to 4%.

16. The over-current and thermal protection device according to claim 5 wherein the shape memory strip is bent to result in having a material strain of 6%.

17. An over-current and thermal protection device comprising:

(i) a pair of electrical conductors;

(ii) an electrically conductive resilient switch member interposed between the conductors and engageable to be in contact with the conductors to define an electrical conductivity pathway, and (iii) a thermally responsive actuator cooperatively engaged with said switch member, comprising a shape memory alloy in thermally conductive communication with a surface of said switch member and having a first metallurgical state below a predetermined temperature level and a second state above the predetermined temperature level wherein the switch member being in engagement with both conductors in one of the states and being in engagement with only one of the conductors in the other of said states.

18. An over-current and thermal protection device assembly for application to a battery cell comprising an electrically conductive cap member and an electrically conductive base member, which forms an enclosure housing a switch member and a thermally responsive actuator of a shape memory alloy in a thermally conductive communication with a surface of said switch member and defining a closed electrical pathway wherein the actuator is activatable in response to a change in temperature at a predetermined level to effect a break in the electrical pathway.

19. The over-current and thermal protection device assembly of claim 18 wherein the assembly is disposed and secured at the open end of a can of the battery cell.

20. The over-current and thermal protection device assembly of claim 19 wherein the assembly is disposed and secured at the open end of a can of the battery cell by a grommet having a first inner peripheral channel and a second inner peripheral channel resiliently securing the cap member and the base member in the respective inner channels in electrical insulation from each other, the switch member being formed as part of a conductor disc interposed between the cap member and the base member and secured by the grommet in contact with one of the cap member and the base member and having an elongated member engageable in contact with the other one of the cap member and the base member; and wherein the thermally responsive actuator includes a shape memory alloy strip secured along the length of the elongated member and in response to a change in temperature at a predetermined level to effect a change in the position of engagement of the elongated member with the said other one of the cap member and the base member.

21. The over-current and thermal protection device end cap assembly of claim 18, which further comprises an electrically conductive pressure resistant plate having at least one aperture therethrough, wherein a portion of the pressure resistant plate and a portion of a weakened portion forms at least part of the electrically conductive pathway.

22. The over-current and thermal protection device assembly of claim 18, which further comprises an electrically conductive pressure resistant plate secured to a weakened portion of the base member, wherein the portion of the base member deforms to cause a break in the electrical pathway thereby severing electrical connection between the cap member and the base member when the internal gas pressure of the battery cell reaches a first predetermined level.

23. The over-current and thermal protection device assembly of claim 22 wherein the weakened portion ruptures when the assembly is applied to a battery cell and gas pressure within the cell reaches a second predetermined level greater than the first predetermined level, whereupon gas from the interior of the cell passes through said ruptured weakened portion and into the enclosure of the assembly.

24. The over-current and thermal protection device assembly of claim 22, wherein the first predetermined gas pressure level is between approximately 120–150 psi.

25. The over-current and thermal protection device-assembly of claim 23, wherein the second predetermined gas pressure level is between approximately 300–350 psi.

26. The over-current and thermal protection device end cap assembly of claim 18 wherein the based member has a burst groove therein of reduced thickness.

27. The over-current and thermal protection device end cap assembly of claim 26 wherein the burst groove conforms generally to a major portion of the outer peripheral shape of the base member wherein the burst groove provides a rupture path for the weakened portion of the base member.

28. The over-current and thermal protection device end cap assembly of claim 27 wherein the bust groove is of substantially "C" shape.

29. The over-current and thermal protection device end cap assembly of claim 18 wherein the cap member has at least one aperture therethrough so that gas from the interior of the cell which accumulates in the end cap assembly enclosure may pass through the aperture outside the end cap assembly.

* * * * *